No. 870,290.

PATENTED NOV. 5, 1907.

A. W. HENKEL.
ROTARY ENGINE.
APPLICATION FILED JAN. 21, 1907.

2 SHEETS—SHEET 2.

UNITED STATES PATENT OFFICE.

ADOLF W. HENKEL, OF KENOSHA, WISCONSIN, ASSIGNOR OF ONE-HALF TO ROBERT ERSKINE WILKINSON, OF KENOSHA, WISCONSIN.

ROTARY ENGINE.

No. 870,290.         Specification of Letters Patent.         Patented Nov. 5, 1907.

Application filed January 21, 1907. Serial No. 353,215.

*To all whom it may concern:*

Be it known that I, ADOLF W. HENKEL, a citizen of the United States, and a resident of the city of Kenosha, in the county of Kenosha and State of Wisconsin, have invented certain new and useful Improvements in Rotary Engines; and I do hereby declare that the following is a full, clear, and exact description of the same, reference being had to the accompanying drawings, and to the letters of reference marked thereon, which form a part of this specification.

This invention relates to improvements in rotary engines of that class in which radially movable heads or abutments receive the pressure of the steam or other motive fluid. In rotary engines of this class heretofore the heads or abutments usually have been moved outwardly by centrifugal force and in consequence when the motor is running at a high speed the outward tendency of the head in itself produces such friction on the inner wall of the cylinder, as to act like a powerful air or steam brake to retard the rotation of the revolving element, thus more than offsetting whatever advantage might otherwise been gained in the construction. Furthermore when the head is at its outward limit of movement and the steam pressure is thereon, considerable power is required ordinarily, to shift the head inwardly and where this movement is accomplished only by the frictional engagement of the head with the wall of the cylinder, the friction is very great, entirely independent of any centrifugal tendency of the head, but when considered in relation with such a centrifugal tendency its resistance to inward movement must be enormous.

The object of this invention is to provide an exceedingly simple mechanism, whereby the outward and the inward movements of the heads are accomplished mechanically and independently of centrifugal force, or the resistance of the wall of the cylinder and wherein all the movements of the abutments or heads are effected practically without friction.

It is also an object of the invention to provide an exceedingly simple, durable and effective device of the class described having few working parts and in which the rotation of the revolving element may be instantly reversed when desired.

The invention consists in the matters hereinafter described and more fully pointed out and defined in the appended claims.

Figure 1:
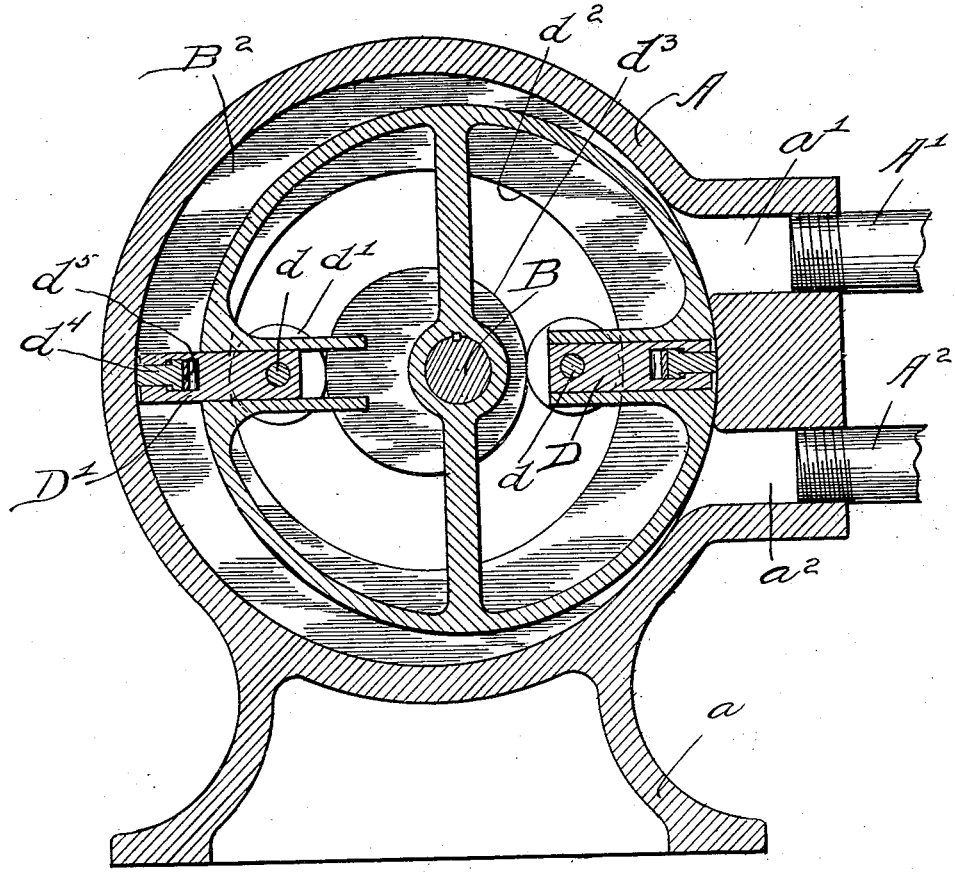
Figure 2:
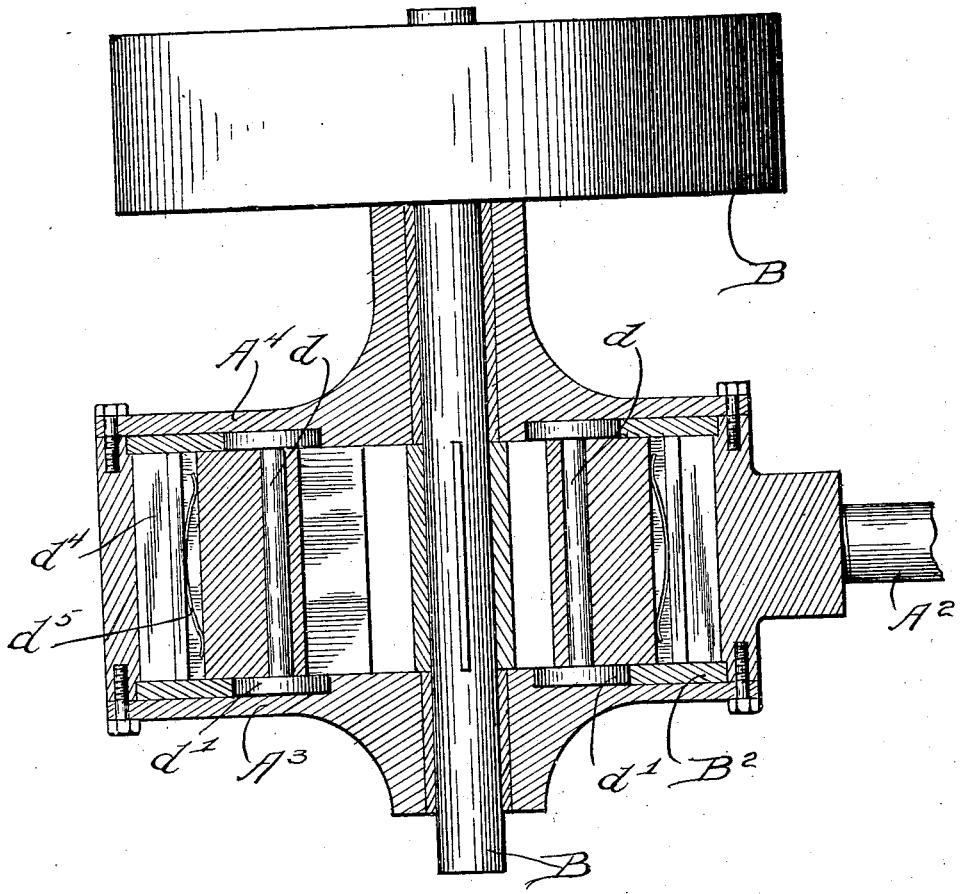

In the drawings: Figure 1 is a transverse section of a device embodying my invention. Fig. 2 is a horizontal section taken along the main shaft.

In the drawings: A, indicates the cylinder which may be supported in any suitable position or upon any suitable foundation, but as shown, is supported upon an integral cast base $a$ and is provided at one side with ports $a'$ and $a^2$ opening thereinto one above the other below the center and in which are connected respectively the pipes $A'$ and $A^2$ either of which may be used as the steam pipe, the other being used as the exhaust pipe, and which may be connected by any suitable four way valve (not shown) to enable the reversal to be effected. Journaled eccentrically in said cylinder and nearer said ports than the opposite side of the cylinder is the drive shaft B, which is journaled in suitable bearings in the heads $A^3$ and $A^4$, of the cylinder and at one end is provided with a balance wheel $B'$, which may also serve as a belt pulley. Rigidly and axially secured on said shaft and of a diameter to revolve close against said port openings in the cylinder wall, is a cylindric body slotted longitudinally on opposite sides to receive the sliding abutments or pistons D—D' which fit closely in said slots and extend the entire length of said cylindric body. A longitudinal shaft $d$, extends through the inner end of each abutment and is provided at each end with a wheel or roller $d'$ which extends into a groove in the inner face of each cylinder head and concentric with the cylinder so that as the shaft B revolves the rollers $d'$, track on the side walls $d^2$—$d^3$, of the grooves in said heads and draw the abutments back and forth to take the steam and to cut off successively entirely independent of the direction of rotation. As shown, said abutments are packed to prevent the escape of steam past the same. For this purpose a T shaped bar $d^4$, of any suitable metal is seated in a suitable groove in the outer edge of each abutment and is normally held outwardly by a spring $d^5$, seated in the bottom of the groove and bearing thereagainst.

The operation is obvious: The steam entering through the pipe $A'$ passes through the port $a'$ and pressing on the abutment $D'$ rotates the cylindric body $B'$. Exhausting at last through the port $a^2$ and pipe $A^2$, and in reversing the steam admitted through the pipe $A^2$ and port $a^2$, exhausts through the port $a'$ and pipe $A'$. The movements of each abutment is practically without friction, inasmuch as the rollers $d'$, roll on the inner wall $d^3$ of the grooves when the pistons or abutments slide outwardly and are drawn back by rolling on the outer wall of $d^2$ of said grooves thus the pistons are at all times mechanically operated and undue pressure can never be exerted or any considerable friction occasioned thereby on the cylinder wall.

Of course, all parts requiring packing are packed with any suitable packing and the grooves in said heads may be formed wholly in the head or an outer ring $B^2$ of proper thickness seated to afford a bearing face on its inner side.

Obviously details of construction may be changed and any suitable throttle valve or valves may be used without departing from the principles of this invention.

I claim as my invention:

1. In a device of the class described the combination with a cylinder of a head on each end thereof, a rotary element journaled eccentrically in said cylinder, piston or abutments radially slidable therein, a cam integral with each head, a removable ring bearing against each head and rollers carried on each abutment or piston adapted to track between said cam and ring.

2. In a rotary engine the combination with a cylinder having inlet and exhaust ports of a head rigidly engaged to each end of the cylinder, a rotary element journaled eccentrically in the cylinder, a reciprocating abutment or piston in said element, oppositely disposed wheels journaled to the piston, a cam adapted to force said abutments outwardly and a removable ring adapted to actuate the abutments inwardly.

3. In a rotary engine, a cylinder having a head rigidly bolted to each end, a rotary element in the cylinder, an abutment or piston slidable radially in said element, a shaft journaled in each, a wheel rigidly engaged on each end thereof, a cam adapted to contact each wheel to positively extend the abutment to contact the cylinder and a removable element adapted to retract said piston or abutment.

In testimony whereof I have hereunto subscribed my name in the presence of two subscribing witnesses.

ADOLF W. HENKEL.

Witnesses:
C. W. HILLS,
GEO. W. DANZ.